United States Patent Office 3,336,379
Patented Aug. 15, 1967

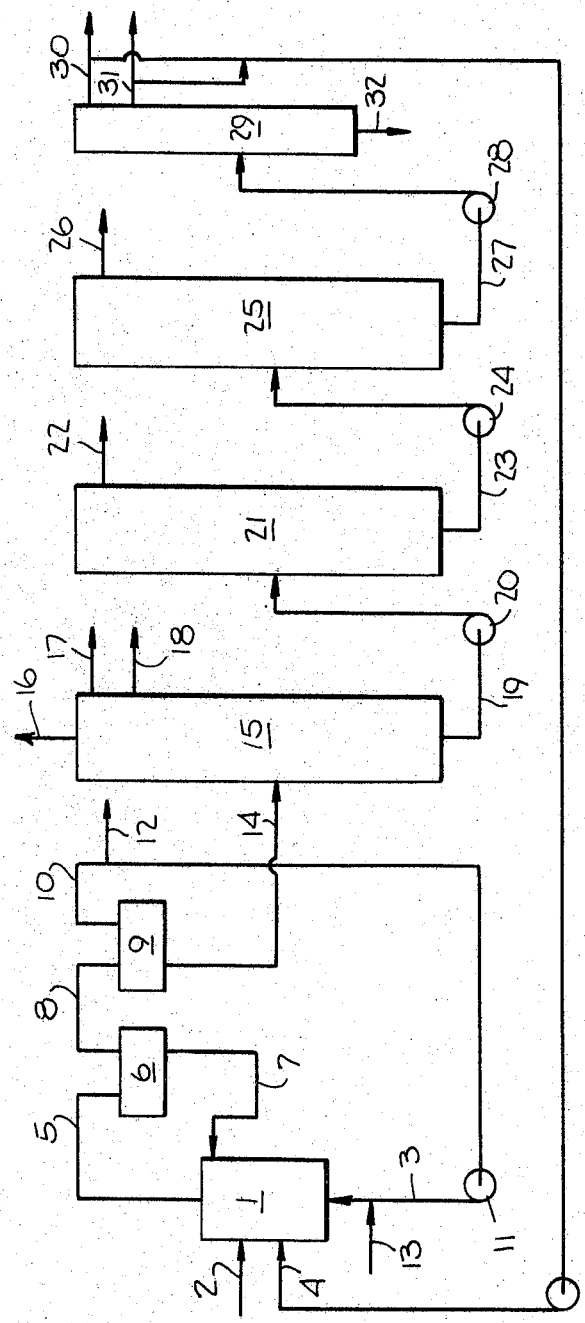

3,336,379
PROCESS FOR THE PRODUCTION OF ACETIC
ANHYDRIDE
Gilbert Sitaud and Paul Biarnais, Melle, Deux-Sevres,
France, assignors to Les Usines de Melle, Melle, Deux-
Sevres, France, a corporation of France
Filed Nov. 1, 1963, Ser. No. 320,778
Claims priority, application France, Nov. 5, 1962,
914,346
5 Claims. (Cl. 260—546)

This invention relates to improvements in the production of acetic anhydride by oxidation of acetaldehyde.

British Patent 653,942 and United States Patent 2,575,-159 describe the production of acetic anhydride by direct oxidation of acetaldehyde with molecular oxygen or an oxygen containing gas in a liquid reaction medium containing acetic acid and anhydride together with an aldehyde oxidation catalyst at a temperature of 30° C. to 60° C., the amount of gas being sufficient to entrain the water and acetic anhydride as they are formed. The operation is carried out in a reactor fitted with a device for providing intimate contact between gas and liquid. All or part of the oxygen containing gas together with a part of the anhydride produced is returned to the reaction bath after removal of the entrained vapors by condensation so as to maintain the volume and composition of the bath constant. Acetic anhydride is recovered from the condensate by distillation.

In carrying out the above described process, a certain amount of reaction by-products having boiling points above that of the main products of the reaction (acetic anhydride and acid) are produced.

Because of their low vapor pressure, these high boiling by-products progressively accumulate in the reaction bath until an equilibrium is reached, at which point they are entrained by the circulating gas as they are formed and are found with the main products of the reaction in the liquid condensate recovered from the gas-vapor mixture leaving the reaction medium.

This phenomenon is still more noticeable in the improved process described in British Patent 910,861 in which the gas-vapor mixture leaving the reaction medium is partially condensed in a dephlegmator fed with a controllable stream of cooling water, and the condensate refluxed to the reaction medium so as to keep the level of the bath constant.

In carrying out this improved process in industrial practice, there is found after some weeks running that the condensate produced from the gas-vapor mixture contains about 1% by weight of by-products having a higher boiling point than acetic anhydride, while the oxidation bath contains from 15 to 20% by weight of such by-products. These conditions are those of an equilibrium state which remains substantially constant for several thousand hours running.

The high boiling by-products contained in the condensate are recovered therefrom during the treatment of said condensate for separating the main components thereof, viz., water, acetic acid in pure form and acetic anhydride in pure form. The by-products are collected at the foot of the anhydride rectifying column. Fractionation of by-products by distillation gives the following fractions:

(1) An ethylidene diacetate fraction (about 40% of the total);

(2) A fraction boiling between 80° C. and 115 or 120° C. at a pressure of 30 mm. mercury and representing about 30–40% of the total. This fraction is a mobile liquid having a pleasant odor, a density 20/20=1.06–1.08 and a viscosity at 20° C. of about 2.5 centistokes;

(3) A residual fraction of high specific weight, colored and viscous.

Now, we have found that if such high boiling by-products are returned to the oxidation bath in such a proportion that the content of the bath of products having a boiling point higher than that of actic anhydride be brought to at least 45% by weight, most advantageously between 45–70% by weight the proportion of acetic anhydride produced with respect to acetic acid produced is increased, even though all other factors which have effect on the said proportion, namely the gas throughput per unit of volume of bath, the temperature, the content and kind of catalyst, the acetaldehyde content in the bath and in the gas, the oxygen content in the circulated gas and the like, remain the same.

Moreover, the production of acid and anhydride, in a given time, by a given volume of bath is substantially unaffected by the high content of high boiling by-products in the bath.

It is preferred to return to the oxidation bath only the fraction boiling between 80–120° C. at a pressure of 30 mm. mercury or the mixture of said fraction with the ethylidene diacetate fraction and to exclude the fraction boiling above 120° C. at a pressure of 30 mm. mercury because the latter fraction would too greatly increase the viscosity of the oxidation bath and consequently the exchanges of substances between the gaseous and liquid phases would decrease. The boiling point of acetic anhydride at 30 mm. of mercury is 56° C. At standard pressure it is 140° C.

This invention will be more fully understood by reference to the accompanying FIG. 1 which is a flowsheet schematically illustrating one embodiment of the process of this invention.

Referring to FIG. 1, reactor 1 is fed with acetaldehyde by pipe 2 and with oxygen-containing gas mixture by pipe 3. It also receives by pipe 4 the recycled high boiling by-products in accordance with the present invention.

The gas-vapor mixture leaving the reactor by pipe 5 passes through dephlegmator 6 fed with a controllable stream of cooling water, in which there is condensed an amount of vapors sufficient for the resulting liquid, returned to the reactor by pipe 7, to maintain the volume of the reaction mixture constant.

The remaining gases and vapors pass by pipe 8 to the condensing system 9 in which substantially the whole of the remaining vapors is condensed. The uncondensed gases leave condensers 9 by pipe 10 and are returned to reactor 1 by pipe 3 by means of a pump 11 after a portion thereof has been discarded from the system by pipe 12 while a corresponding amount of fresh air is fed to the gaseous circuit by pipe 13.

The condensate from the condensers is fed by pipe 14 to a first distillation column 15, from which the volatile substances are recovered. The acetaldehyde is withdrawn from the top of column 15 by pipe 16, the low boiling by-products are withdrawn slightly below by pipe 17 and the water still below by pipe 18.

From the foot of column 15 there is withdrawn by pipe 19 a raw mixture of acetic anhydride, acetic acid and high boiling by-products, which is fed by means of pump 20 to the second distillation column 21. Pure acetic acid is recovered from this column by pipe 22 slightly below the top, and raw acetic anhydride in mixture with the high boiling by-products is withdrawin from the foot of the column by pipe 23.

The raw anhydride is fed by means of pump 24 to the third distillation column 25, which is the anhydride purifying column. Pure acetic anhydride is recovered from this column by pipe 26 slightly below the top, and the high boiling by-products are withdrawn from the foot by pipe 27 and fed by means of pump 28 to the fourth distillation column 29 which is the high boiling by-products fractionating column and is operated at a vacuum of 30 mm. Hg. The ethylidene diacetate fraction boiling between 56° C. and 80° C. at the aforesaid pressure is withdrawn by pipe 30 slightly below the top of column 29. The fraction boiling between 80° C. and 120° C. at a pressure of 30 mm. Hg is withdrawn by pipe 31. Either of these fractions, or both, are wholly or in part returned to reactor 1 by pipe 4 by means of cocks (not shown) provided for this purpose. The high boiling, residual fraction is withdrawn from the foot of column 29 by pipe 32.

Of course columns 15, 21, 25 and 29 are fitted, at their respective tops, with condensers to condense the head vapors and with pipes to reflux the condensates to the respective tops of said columns. These devices are not shown in the attached drawing, with a view to not encumber same.

The peculiar behavior of the returned by-products should be pointed out. It has been observed that the dissolving of the cobalt and copper salts employed as catalysts is easier in mixtures of acid, anhydride and higher boiling by-products than in mixtures of acid and anhydride or of acid, anhydride and previously recommended solvents such as methyl phthalate or the like.

Without being bound by such an explanation, we may assume that this greater ease of dissolution of the catalyst salts might be the main cause of the different behavior of the bath. It is even possible to take advantage from this peculiar property to dissolve and maintain in the bath a high concentration of catalyst salts (especially of copper acetate), which favors obtaining a higher proportion of anhydride with respect to acid.

A further advantage of returning high boiling by-products to the bath is an increase of the yield of the reaction. When such by-products are not returned to the bath, the proportion of by-products continuously withdrawn is about 1% as aforesaid. When the whole of the by-products boiling below 120° C. at a pressure of 30 mm. mercury is returned to the bath, it is found that at the equilibrium state, only the viscous, residual by-products representing about 0.2% of the acetic anhydride and acid produced are withdrawn at the foot of the rectifying column.

The following non-limiting examples will illustrate the advantages of this invention.

*Example 1*

(A) As a reference there will be recalled Example 1 of British Patent 910,861 mentioned above, as follows:

The reaction medium is contained in a vessel fitted at its lower part with a device for injecting and dispersing gases throughout the liquid (for example, a porous plate). Liquid acetaldehyde and molecular oxygen-containing gas are introduced into the bath. The gas-vapor mixture leaving the reaction vessel passes through a dephlegmator in which the rate of cooling water is so controlled that the condensed products, which are refluxed to the reaction bath, represent the volume required to maintain the volume of the bath constant.

The mixture of residual gases and vapors leaving the dephlegmator passes through a condenser or condensers in which the remaining reaction products are condensed and sent to a distillation apparatus where they are dehydrated, then separated from one another.

Residual oxygen-containing gas, free from the reaction products is returned to the reaction bath by a blower after a portion thereof has been discarded, and fresh oxygen-containing gas is fed to the system in balance therefor.

The operating conditions are as follows:

Volume of the reaction bath, liters _____ 2000
Acetaldehyde feed, kgs. per hr. _____ 1180
Total gas throughout by blower, cu. meters per hr. _____ 8500
Fresh air feed, cu. meters per hr. _____ 1000
Temperature of reaction bath, ° C. _____ 55
Temperature of fluids at the outlet of the dephlegmator, ° C. _____ 39
Temperature of fluids at the outlet of condensing system, ° C. _____ 10
Amount of liquid refluxed from dephlegmator to the bath, kgs. per hr. _____ 620

Reaction products withdrawn from the condensers to be sent to the distillation apparatus:

Kgs. per hr.
Acetic anhydride _____ 445
Acetic acid _____ 149
Water _____ 81.5
Acetaldehyde _____ 200

On operating in accordance with the above conditions, one obtains an acetic anhydride yield (i.e., acetaldehyde converted into anhydride with respect to acetaldehyde converted into anhydride plus acid) of 77.9%. The output per liter of bath per day is 8.1 kgs. reckoned as acetic acid.

After several hundred hours running, it is found that 6 kgs. per hour of high boiling by-products are produced, and analysis of the bath shows that it contains about 200 grams per liter of said by-products.

Distillation of the high boiling by-products entrained by the gas stream, after separation thereof from the acid anhydride entrained therewith, gives the following results, per hour:

Kgs.
Ethylidene diacetate _____ 2.5
Fraction of boiling range 80–120° C. at a pressure of 30 mm. Hg _____ 2.45
and
Residue boiling above 120° C. at a pressure of 30 mm. Hg _____ 1.05

(B) The operation was carried out exactly under the conditions described above, but in accordance with the present invention there was introduced into the bath, per hour, 7 kgs. of the fraction of boiling range 80–120° C. at a pressure of 30 mm. Hg. After about 300 hours running equilibrium was reached and the following was found:

(a) The bath contained 54% by weight of high boiling by-products;
(b) The output amounted to 7.7 kgs. (calculated as acetic acid) of products per liter of bath per day;
(c) The acetic anhydride yield, as above defined, was 82.5%; and
(d) There was separated per hour from the acid and anhydride 10.87 kgs. of high boiling by-products, comprising:

Kgs.
Ethylidene diacetate _____ 2.82
Fraction of boiling range 80–120° C. at a pressure of 30 mm. Hg _____ 7.2
and
Residue boiling above 120° C. at a pressure of 30 mm. Hg _____ 0.85

The fraction of boiling range 80–120° C. at a pressure of 30 mm. Hg remained substantially constant in weight and accordingly was continuously recycled to the reaction bath.

*Example 2*

Under the same operating conditions as above, there was introduced into the bath, per hour, 5.5 kgs. of the ethylidene diacetate fraction and 5.5 kgs. of the fraction of boiling range 80–120° C. at a pressure of 30 mm. Hg. After about 200 hours running the following was found:

(a) The bath contained 58% by weight of high boiling by-products;

(b) The output amounted to 7.55 kgs. (calculated as acetic acid) of products per liter of bath per day;

(c) The acetic anhydride yield, as above defined, was 81.5%; and (d) There was separated per hour from the acid and anhydride 12.35 kgs. of high boiling by-products, comprising:

|  | Kgs. |
|---|---|
| Ethylidene diacetate | 5.2 |
| Fraction of boiling range 80–120° C. at a pressure of 30 mm. Hg | 6.05 |
| and Residue boiling above 120° C. at a pressure of 30 mm. Hg | 1.1 |

The first and second fractions, of which the total weight remained substantially constant, are accordingly continuously recycled to the reaction bath.

Only the residue fraction is continuously withdrawn corresponding to about 0.2% by weight of the acid plus anhydride produced.

What is claimed is:

1. In a process of producing acetic anhydride by the catalytic oxidation of acetaldehyde with oxygen gas in a liquid reaction medium including the steps of condensing the reaction products and distilling the resulting condensate to separate acetic anhydride therefrom, the improvement which comprises returning at least a portion of the high boiling reaction by-products having a boiling point above that of acetic anhydride to the reaction medium so that the said medium contains from about 45% to about 70% by weight of said high boiling by-products, said portion including high boiling by-products boiling between about 80° C. and about 120° C. at a pressure of 30 mm. of mercury.

2. In a process of producing acetic anhydride by the catalytic oxidation of acetaldehyde with air in a liquid reaction medium including the steps of condensing the reaction products and distilling the resulting condensate to separate acetic anhydride therefrom, the improvement which comprises returning at least a portion of the high boiling reaction by-products having a boiling point above that of acetic anhydride to the reaction medium so that the said medium contains from about 45% to about 70% by weight of said high boiling by-products, said portion including high boiling by-products boiling between about 80° C. and about 120° C. at a pressure of 30 mm. of mercury.

3. In a process of producing acetic anhydride by the catalytic oxidation of acetaldehyde with oxygen gas in a liquid reaction medium including the steps of condensing the reaction products and distilling the resulting condensate to separate acetic anhydride therefrom, the improvement which comprises returning at least part of the reaction by-products boiling between about 80° C. and about 120° C. at a pressure of 30 mm. of mercury so that the said medium contains from about 45% to about 70% by weight of said by-products.

4. In a process of producing acetic anhydride by the catalytic oxidation of acetaldehyde with air in a liquid reaction medium including the steps of condensing the reaction products and distilling the resulting condensate to separate acetic anhydride therefrom, the improvement which comprises returning at least part of the reaction by-products boiling between about 80° C. and about 120° C. at a pressure of 30 mm. of mercury so that the said medium contains from about 45% to about 70% by weight of said by-products.

5. In a process of producing acetic anhydride by the catalytic oxidation of acetaldehyde with oxygen gas in a liquid reaction medium including the steps of condensing the reaction products and distilling the resulting condensate to separate acetic anhydride therefrom, the improvement which comprises returning at least a part of each of the separate reaction by-products boiling in the ranges below 80° C. and above 56° C. at a pressure of 30 mm. of mercury and from 80° C. to about 120° C. at the same pressure so that the said medium contains from about 45% to about 70% by weight of said reaction by-products.

References Cited

UNITED STATES PATENTS

| 2,170,002 | 8/1939 | Benson | 260—546 |
| 2,658,914 | 11/1953 | Rigon | 260—546 |
| 3,258,483 | 6/1966 | Alheritiere et al. | 260—546 |

LORRAINE A. WEINBERGER, *Primary Examiner.*

R. K. JACKSON, *Assistant Examiner.*